(12) United States Patent
Pifer

(10) Patent No.: US 7,891,371 B2
(45) Date of Patent: Feb. 22, 2011

(54) VENT VALVE

(75) Inventor: Daniel Lee Pifer, Chelsea, MI (US)

(73) Assignee: Eaton Corporation, Cleveland, OH (US)

( * ) Notice: Subject to any disclaimer, the term of this patent is extended or adjusted under 35 U.S.C. 154(b) by 654 days.

(21) Appl. No.: 11/957,666

(22) Filed: Dec. 17, 2007

(65) Prior Publication Data

US 2008/0149193 A1 Jun. 26, 2008

Related U.S. Application Data

(60) Provisional application No. 60/871,594, filed on Dec. 22, 2006.

(51) Int. Cl.
*F16K 24/04* (2006.01)

(52) U.S. Cl. ...................................... 137/202

(58) Field of Classification Search ................ 137/171, 137/197, 199, 202, 587, 39, 43
See application file for complete search history.

(56) References Cited

U.S. PATENT DOCUMENTS

| 4,062,910 | A |   | 12/1977 | Rogerson et al. |        |
|-----------|---|---|---------|-----------------|--------|
| 5,313,977 | A |   | 5/1994  | Bergsma et al.  |        |
| 5,590,736 | A |   | 1/1997  | Morris et al.   |        |
| 5,687,753 | A | * | 11/1997 | Doll ............ | 137/43 |
| 5,687,756 | A |   | 11/1997 | VanNatta et al. |        |
| 5,960,816 | A |   | 10/1999 | Mills et al.    |        |
| 6,145,532 | A |   | 11/2000 | Tuckey et al.   |        |
| 6,298,540 | B1 |  | 10/2001 | Benjey et al.   |        |
| 6,719,000 | B1 |  | 4/2004  | Forsythe et al. |        |
| 6,779,544 | B2 |  | 8/2004  | Devall          |        |
| 6,848,463 | B2 |  | 2/2005  | Johansen        |        |
| 6,899,119 | B2 | * | 5/2005 | Ehrman et al. ...... | 137/202 |
| 7,147,017 | B2 |  | 12/2006 | Leonhardt       |        |
| 2001/0050104 | A1 | | 12/2001 | Nishi          |        |
| 2004/0003844 | A1 | | 1/2004 | Yamada          |        |
| 2004/0238033 | A1 | | 12/2004 | Miyoshi         |        |

FOREIGN PATENT DOCUMENTS

| WO | WO 9706973 | 2/1997 |
| WO | WO 0159339 | 8/2001 |

OTHER PUBLICATIONS

European Patent Office, International Search Report for PCT/IB2007/004063 mailed May 7, 2008.
European Patent Office, Written Opinion for PCT/IB2007/004063 mailed Jun. 22, 2009.
European Patent Office, International Preliminary Report Patentability for PCT/IB2007/004063 mailed Jun. 24, 2009.

* cited by examiner

*Primary Examiner*—Craig M Schneider
(74) *Attorney, Agent, or Firm*—Dykema Gossett PLLC

(57) ABSTRACT

A vent valve comprising an outer sleeve including a vent window; a housing disposed within the outer sleeve, the housing including a vent slot; a baffle disposed in front of the vent slot. Embodiments of the invention may include a float disposed within the outer sleeve, a flapper disposed within the outer sleeve, an end cap, and/or a venting orifice. In an embodiment the vent window and the vent slot may oppose one another and can, for instance, be positioned approximately 180° apart.

19 Claims, 3 Drawing Sheets

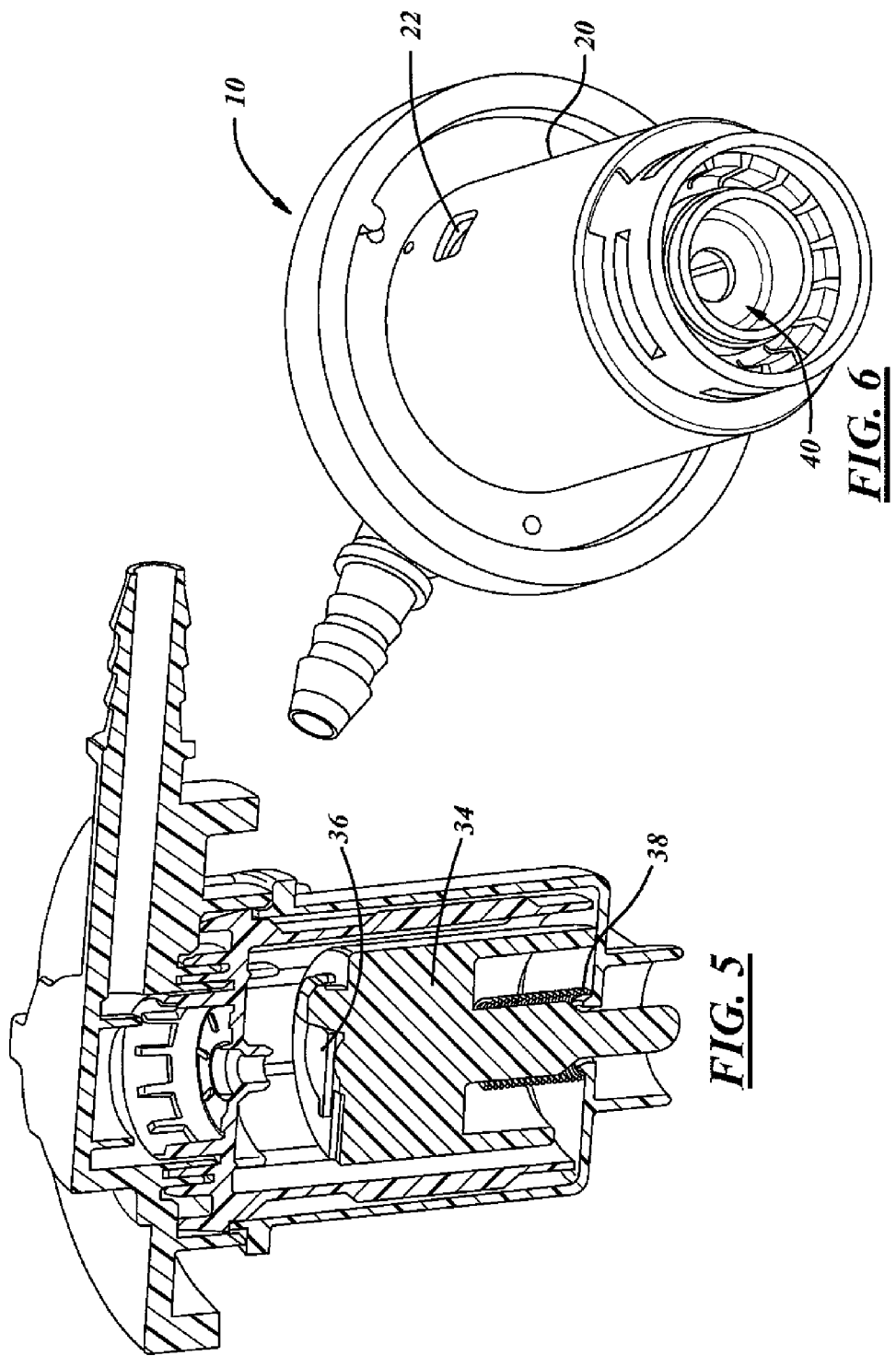

VENT VALVE

RELATED APPLICATIONS

This application claims the benefit of U.S. Provisional Patent Application No. 60/871,594 filed Dec. 22, 2006, hereby incorporated by reference in its entirety.

BACKGROUND a. Field of Invention

The invention relates generally to a rollover vent valve, including a rollover vent valve that is capable of preventing liquid carry-over during dynamic conditions.

b. Description of Related Art

Fuel level responsive vent valves are conventionally used in automobile fuel tanks. Vent valves may be located in the fuel tank to remain open when the fuel is below a certain level, and to close when the fuel reaches the valve. Two common applications of these valves are "rollover" valves, which respond to abnormal fuel levels or unusual vehicle angles to close a vapor outlet from the tank, and fuel shutoff or "fill control" valves which are positioned to close when the fuel tank reaches the "full" level during refueling.

In order to provide protection against fuel spilling from the vapor vent line in a fuel tank in the event of vehicle rollover, motor vehicle fuel tanks are generally equipped with valves which close the vapor vent when the vehicle is tilted beyond a threshold amount from the normal upright position. Such rollover/vent valves conventionally employ a float which closes the valve when the liquid level of the fuel rises above a predetermined level in order to prevent liquid fuel from sloshing out of the vapor vent either during normal operation or in the event of rollover. Generally, the valve may be located at the highest portion or the location of the deepest fuel level in order to provide vapor venting at all levels of fuel up to the maximum fuel level.

Rollover vent valves may vent fuel vapor from a vehicle fuel tank to the atmosphere or to a vapor recovery system, such as a carbon canister. Such valves typically vent the interior of the fuel tank to the carbon canister when the fuel in the tank is below the level of the valve, and are closed by a float when the fuel surges in a rollover situation. Closing the valve in response to surging liquid fuel level prevents the overflow of liquid fuel into the carbon canister. If employed as a fill-control vent valve, rather than rollover vent valve, closure is in response to a full fuel level rather than surge and results in a pressure head within the fuel tank and filler pipe to operate automatic shutoff apparatus built into the fuel fill nozzle.

Rollover vent valves are generally used to discriminate vapor from liquid. The valve may provide for flow of vapor in the presence of vapor and prevent liquid flow in the presence of liquid, and may do so under various conditions. Conventional rollover vent valves may perform this function at various degrees of effectiveness under static conditions. Under static conditions, conventional rollover vent valves may use a float and spring mechanism that is biased to closed in the presence of the liquid buoyant force. The float may be designed to be heavier than the spring force, so that the float may move to the open position when it is not in the presence of a liquid.

A need remains for a vent valve that is capable of preventing liquid carry-over during dynamic conditions.

SUMMARY

A vent valve comprising an outer sleeve including a vent window; a housing disposed within the outer sleeve, the housing including a vent slot (e.g., an inner vent slot); a baffle disposed in front of the vent slot. Embodiments of the invention may include a float disposed within the outer sleeve, a flapper disposed within the outer sleeve, an end cap, and/or a venting orifice. In an embodiment the vent window and the vent slot may oppose one another and can, for instance, be positioned approximately 180° apart.

Various features of this invention will become apparent to those skilled in the art from the following detailed description, which illustrates embodiments and features of this invention by way of non-limiting examples.

BRIEF DESCRIPTION OF THE DRAWINGS

Embodiments of the invention will now be described, by way of example, with reference to the accompanying drawings, wherein:

FIG. 5 is a cross-sectional view of a valve showing the general internal valve mechanism, including a flapper, float, and float spring, that may be used in a valve in accordance with an embodiment of the invention.

FIG. 6 is a bottom perspective view of a valve in accordance with an embodiment of the invention, including the end cap configuration.

DETAILED DESCRIPTION

Reference will now be made in detail to embodiments of the present invention, examples of which are illustrated in the accompanying drawings. While the invention will be described in conjunction with the embodiments, it will be understood that they are not intended to limit the invention to these embodiments. On the contrary, the invention is intended to cover alternatives, modifications and equivalents, which may be included within the spirit and scope of the invention as embodied in or defined by the appended claims.

Figure 1:
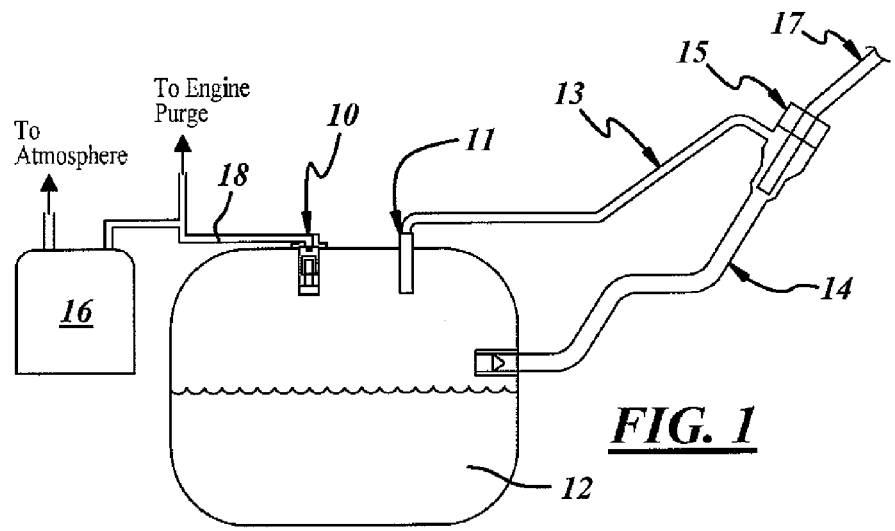
FIG. 1 is a schematic view of a vehicle fuel system employing a valve in accordance with an embodiment of the invention.

Referring now to FIG. 1 which illustrates a schematic view of a vehicle fuel system, a rollover vent valve 10 may be generally mounted in the fuel tank 12 of a vehicle fuel system. The vehicle fuel system may include a dip tube 11, a recirculation line 13, a fill cup 15, and a refueling nozzle 17. The vehicle fuel system may include a filler pipe 14 for introducing fuel into the fuel tank 12 and a vapor canister 16 to which fuel vapor is vented from the tank 12 through valve 10 via a vent line 18. When the fuel level in the tank 12 is below valve 10, valve 10 may be open and may provide high volume venting of fuel vapor to canister 16. When liquid fuel reaches valve 10 due to fuel slosh or surge, or when there is a rollover situation, valve 10 may respond by closing, thereby shutting off flow to the vapor canister 16 and protecting canister 16 from saturation.

Figure 2:
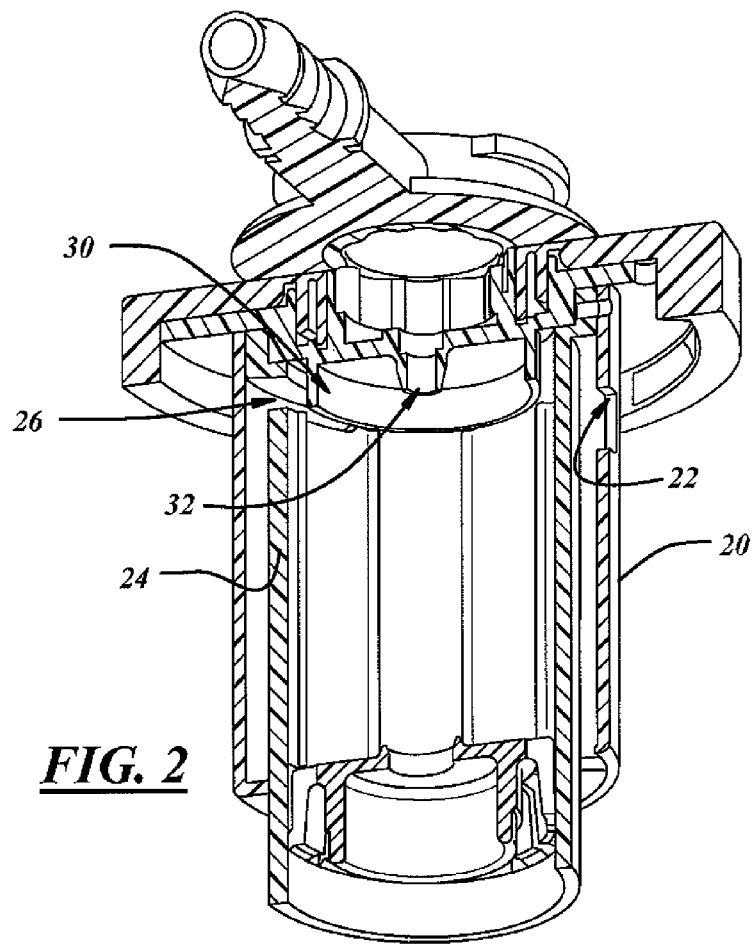
FIG. 2 is a cross-sectional view of a valve in accordance with an embodiment of the invention.
Figure 3:
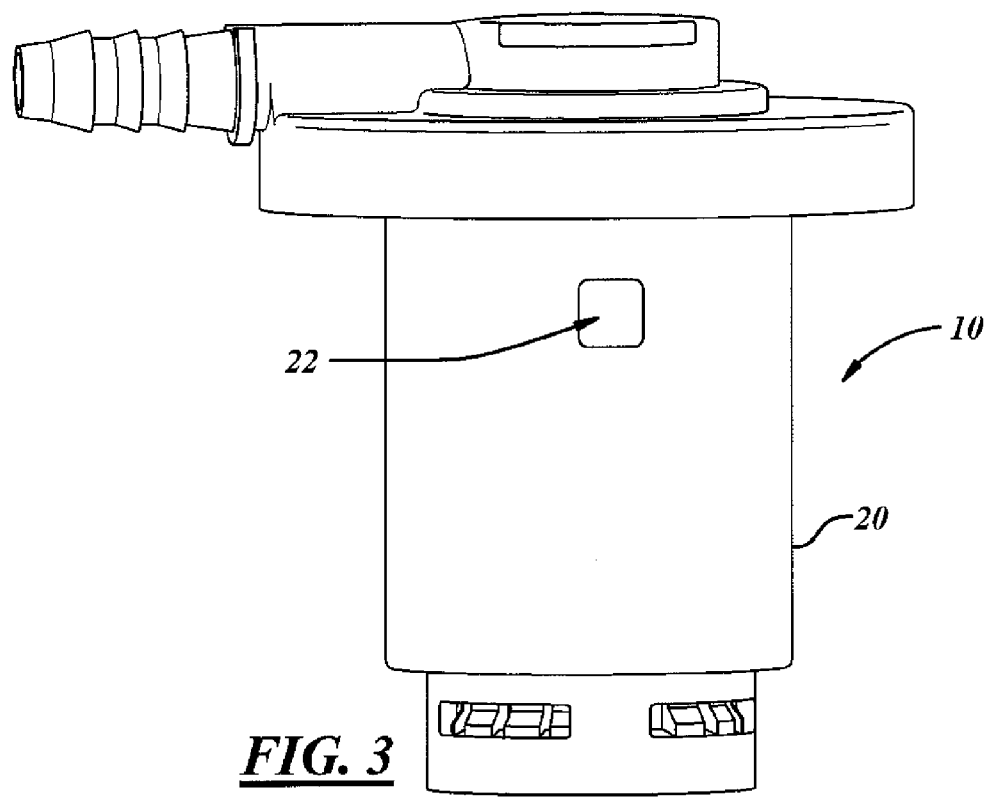
FIG. 3 is a side view of a valve in accordance with an embodiment of the invention.

As generally illustrated in FIGS. 2 and 3, valve 10 may comprise a hollow outer sleeve 20, which if desired can be cylindrical or generally cylindrical in shape. The outer sleeve 20 may be molded, for example, from a fuel-resistant plastic and, if desired, may be mounted in a wall of fuel tank 12.

In an embodiment, the outer sleeve 20 may include a vent window 22. The vent window 22 can be configured to allow vapor venting in the valve-open condition, and to allow liquid fuel to enter the interior of the outer sleeve 20 and raise a float to a closed position, such as described in more detail below. For some embodiments the vent window 22 may be generally square or rectangular in shape; however, for other embodiments, vent window 22 may be circular or generally circular. The vent window 22 may, at least in comparison to outer sleeve 20, be generally small in size. For example only, in an embodiment, vent window 22 may be approximately 6 mm by approximately 6 mm in width and height. By way of example only, and without limitation, in another embodiment, vent window 22 may be approximately 6 mm wide by approximately 8 mm high. In another embodiment, vent window 22 may be generally circular and have a diameter of approximately 6 mm. In some embodiments, vent window 22 may have an area ranging from approximately 25 mm$^2$ to approximately 50 mm$^2$. Vent window 22 may have a smaller or larger area in other embodiments. The vent window 22 may be disposed in the upper portion (e.g., upper one-half, towards the top) of valve 10. Referring now to FIG. 3, the location and comparatively small size of vent window 22 for improving carryover is illustrated.

Referring again to FIG. 2, valve 10 may further include a housing 24. Housing 24 may be cylindrical or generally cylindrical in shape. Housing 24 may include a vent slot 26 (e.g., an inner vent slot). Vent slot 26 may be disposed in the upper portion (e.g., upper one-half, towards the top) of valve 10. Vapor and liquid that enters vent slot 26 may travel down valve 10 first before rising up to a venting orifice 32 as generally described further below.

Figure 4:
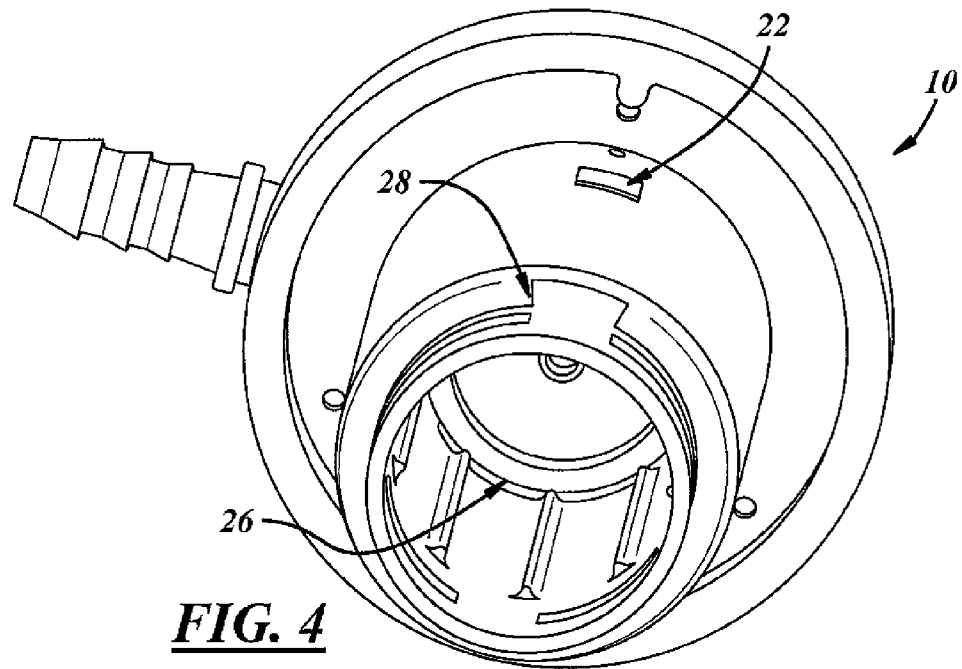
FIG. 4 is a bottom perspective view of a valve in accordance with an embodiment of the invention.

In an embodiment, such as generally illustrated in FIG. 2, vent window 22 of outer sleeve 20 and vent slot 26 of housing 24 may generally oppose each other (i.e., they may be positioned approximately 180° from each other). As such, the location of vent window 22 and vent slot 26 can be configured to help separate liquid and vapor. Referring to FIG. 4, the location of a vent window 22 and a vent slot 26 are illustrated in accordance with an embodiment of the invention. FIG. 4 also shows an outer sleeve drain 28 that may be included with outer sleeve 20.

Referring again to FIG. 2, valve 10 may further include an inner baffle 30. Inner baffle 30 may be located in front of inner vent slot 26 and may reduce carryover (i.e., prevent liquid from getting to the venting orifice 32 as generally described below). In an exemplary embodiment, inner baffle 30 may specifically be positioned in front of vent slot 26. Valve 10 may also include venting orifice 32. In an embodiment, as generally described further below, venting orifice 32 may be sealed by a flapper of a float that may rise within valve 10.

In an embodiment, outer sleeve 22 of valve 10 may house an internal valve mechanism. The internal valve mechanism may comprise a fuel responsive float 34, for example, as generally illustrated in FIG. 5. Float 34 may be positioned within a float chamber in valve 10 to move up and down in response to the level of fuel in fuel tank 12. The float displaced volume may be maximized, while the float weight may be minimized. The float 34 may be configured and sized so as to be freely slidable within the float chamber. Accordingly, in an embodiment, the float volume may be as large as packaging of the valve allows. For example, and without limitation, the float displaced volume may be approximately 6.8 cm$^3$ or approximately 8.9 cm$^3$ if the trapped air bubble is included in the displaced volume. The float displaced volume may be lower or higher in other embodiments. In some embodiments, the float displaced volume may be greater than 6.0 cm$^3$. However, the float volume may not be so large so as to comprise the function of valve 10. Further, the float weight may be minimized so as to be as close to zero as possible. For example, and without limitation, the float weight may be approximately 9.3 grams. The float weight may be lower of higher in other embodiments. In some embodiments, the float weight may be less than 10.0 grams. In an embodiment, under dynamic conditions, a vent valve may allow an associated float to close in the presence of liquid faster than the liquid can reach a venting orifice and allow liquid to be removed from the vicinity of the venting orifice prior to reopening, which can serve to prevent residual liquid from being whisked into the air steam and carried out of the valve.

In an embodiment, a leveraged flapper 36 (i.e., disc or handle that is offset from float 34) may be included and may allow the float weight to be minimized, which in turn can permit float 34 to react faster to close the valve 10 in the presence of buoyant force. Flapper 36 may be located on an upper portion or end of float 34. Flapper 36 may seal venting orifice 32 when float 34 rises within valve 10, and may be operated by float 34 to open and close venting orifice 32 for selective fuel vapor venting from tank 12 to canister 16.

The internal valve mechanism may further include a float spring 38. Float spring 38 may be provided to move float 34, so that float 34 may have a range of spring-based motion.

A long float stroke (i.e., the distance float 34 moves from a fully opened to fully closed position) may allow float 34 to be further away from the venting orifice 32 during reopening flows. This longer float stroke may prevent residual liquid on top of float 34 from entering the flow stream. In an embodiment, the float stroke may be greater than approximately 3 mm. In another embodiment, the float stroke may be approximately 6 mm.

Referring to FIG. 6, valve 10 may further include an end cap 40. The end cap 40 may be configured to function or act as a nozzle or drain. In an embodiment, the end cap 40 may comprise a cone-shaped end cap or a cylindrical funnel end cap. End cap 40 may focus the wave of liquid into a stream to shoot float 34 closed. The focusing of liquid by end cap 40 may improve the response time of float 34.

The foregoing descriptions of specific embodiments of the present invention have been presented for purposes of illustration and description. They are not intended to be exhaustive or to limit the invention to the precise forms disclosed, and various modifications and variations are possible in light of the above teaching. The embodiments were chosen and described in order to explain the principles of the invention and its practical application, to thereby enable others skilled in the art to utilize the invention and various embodiments with various modifications as are suited to the particular use contemplated. It is intended that the scope of the invention be defined by the claims and their equivalents.

What is claimed is:

1. A vent valve having a first end and a second end, the vent valve comprising:
   an orifice located in the first end of the vent valve,
   an outer sleeve including a vent window disposed in a first half of the vent valve, the first half of the vent valve located near the first end of the vent valve;
   a housing disposed within the outer sleeve, the housing including a vent slot disposed in the first half of the vent valve; and a baffle disposed in front of the vent slot, the baffle extending from the first end of the vent valve toward the second end of the vent valve between the orifice and the housing, wherein the vent window is closer than the vent slot to the second end of the vent valve.

2. A vent valve in accordance with claim 1, wherein the baffle is disposed in front of the entire vent slot and is not disposed in front of the entire vent window.

3. A vent valve in accordance with claim 1, wherein the vent window and the vent slot are positioned approximately 180° apart.

4. A vent valve in accordance with claim 1, wherein the vent window is generally square or rectangular or circular in shape.

5. A vent valve in accordance with claim 1, wherein the area of the vent window is approximately 25 mm$^2$ to approximately 50 mm$^2$.

6. A vent valve in accordance with claim 1, wherein the width or diameter of the vent window is approximately 6 mm.

7. A vent valve in accordance with claim 1, wherein the length of the vent window is approximately 8 mm.

8. A vent valve in accordance with claim 1, wherein the outer sleeve includes a single vent window and the housing includes a single vent slot.

9. A vent valve in accordance with claim 1, further comprising an end cap.

10. A vent valve in accordance with claim 9, wherein the end cap comprises one of a cone or a cylindrical funnel.

11. A vent valve in accordance with claim 1, further comprising a float disposed within the outer sleeve.

12. A vent valve in accordance with claim 11, further comprising a spring for moving the float.

13. A vent valve in accordance with claim 11, wherein the float has a float stroke that is greater than 3 mm.

14. A vent valve in accordance with claim 13, wherein the float stroke is approximately 6 mm.

15. A vent valve in accordance with claim 11, further comprising a venting orifice.

16. A vent valve in accordance with claim 15, further comprising a flapper disposed within the outer sleeve, the flapper configured to close the venting orifice when the float rises.

17. A vent valve in accordance with claim 16, wherein the flapper comprises a disc.

18. A vent valve in accordance with claim 17, wherein the flapper is leveraged.

19. A vent valve having a first end and a second end, the vent valve comprising:

an outer sleeve including a single vent window disposed in a first half of the vent valve, the first half of the vent valve located near the first end of the vent valve;

a housing disposed within the outer sleeve, the housing including a single vent slot disposed in the first half of the vent valve, wherein the vent window and the vent slot are positioned approximately 180° apart and wherein the vent window is closer than the vent slot to the second end of the vent valve;

a baffle disposed in front of the vent slot, the baffle extending from the first end of the vent valve toward the second end of the vent valve, wherein the baffle is disposed in front of the entire vent slot and is not disposed in front of the entire vent window;

a float disposed within the outer sleeve, wherein the float has a float stroke that is greater than 3 mm;

a spring for moving the float;

a venting orifice;

a leveraged flapper connected to the float, wherein the flapper is configured to close the venting orifice when the float rises; and an end cap, wherein the end cap comprises one of a cone or a cylindrical funnel.

\* \* \* \* \*